(12) United States Patent
Gooch

(10) Patent No.: US 7,085,271 B2
(45) Date of Patent: Aug. 1, 2006

(54) METHOD AND SYSTEM FOR PERFORMING FLOW BASED HASH TRANSFORMATION TO GENERATE HASH POINTERS FOR A NETWORK DEVICE

(75) Inventor: Mark Gooch, Citrus Heights, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 971 days.

(21) Appl. No.: 10/098,984

(22) Filed: Mar. 14, 2002

(65) Prior Publication Data

US 2003/0174710 A1  Sep. 18, 2003

(51) Int. Cl.
*H04L 12/56* (2006.01)

(52) U.S. Cl. .................. 370/392; 370/395.2

(58) Field of Classification Search .......... 370/395.32, 370/392, 401; 711/216
See application file for complete search history.

(56) References Cited

U.S. PATENT DOCUMENTS

| | | | |
|---|---|---|---|
| 4,558,302 A * | 12/1985 | Welch | 341/51 |
| 5,708,659 A * | 1/1998 | Rostoker et al. | 370/392 |
| 6,173,384 B1 * | 1/2001 | Weaver | 711/216 |
| 6,775,704 B1 * | 8/2004 | Watson et al. | 709/229 |
| 6,785,278 B1 * | 8/2004 | Calvignac et al. | 370/392 |
| 6,928,162 B1 * | 8/2005 | Heddes et al. | 380/28 |
| 2002/0116527 A1 * | 8/2002 | Chen et al. | 709/245 |
| 2004/0013112 A1 * | 1/2004 | Goldberg et al. | 370/389 |

OTHER PUBLICATIONS

Waldvogel et al. (Scalable high speed IP routing table lookups. In Proceedings of ACM SIGCOMM, pp. 25-36, Sep. 1997).*

* cited by examiner

*Primary Examiner*—Hassan Kizou
*Assistant Examiner*—Salman Ahmed

(57) ABSTRACT

A method for performing flow based address hash transformation in a network device to generate hash pointers. The method includes the steps of receiving a pair of addresses (source address input and destination address input) corresponding to one direction of a data flow. The destination address input is modified by using a rotation operation. Respective hash operations are subsequently performed on the source address input and modified destination address input. The rotation operation performed on the destination address input prevents aliasing between the hash results for the forward direction of a data flow and the reverse direction, thereby preventing hash pointer collisions.

25 Claims, 15 Drawing Sheets

```
if (control == 0)
  {
  Rnext = R3 XOR R2 XOR R1 XOR R0;
  }
else
  {
  Rnext = R3 XOR R2 XOR R1 XOR R0 XOR Rout;
  }
Rout <= Rnext on each positive clock edge
```

FIG. 6 let $S_A = (S_{A3}, S_{A2}, S_{A1}, S_{A0})$, where $S_{An}$ is the $n^{th}$ byte of $S_A$
let $D_A = (D_{A3}, D_{A2}, D_{A1}, D_{A0})$, where $D_{An}$ is the $n^{th}$ byte of $D_A$ 1301 → hash_upper = $(SA_1, SA_2, SA_1, SA_0)$;   // SA is unchanged
1302 → hash_lower = $(DA_0, DA_3, DA_2, DA_1)$;   // DA is rotated right by
                                                  // 1 byte 1303 → result = do_hash(hash_upper, K) XOR do_hash(hash_lower, K);

where = do_hash(D, K) is a 32 bit hash algorithm operating on 32 bit input data D using the 32 bit hash key K

FIG. 13 let $S_A = (S_{A15}, S_{A14}, \ldots, S_{A1}, S_{A0})$ where $S_{An}$ is the $n^{th}$ byte of $S_A$
let $D_A = (D_{A15}, D_{A14}, \ldots, D_{A1}, D_{A0})$ where $D_{An}$ is the $n^{th}$ byte of $D_A$ $$\left.\begin{array}{l} \text{result} = \text{do\_hash}((S_{A15}, S_{A14}, S_{A13}, S_{A12}), K); \\ \text{result} = \text{result xor do\_hash}((S_{A11}, S_{A10}, S_{A9}, S_{A8}), K); \\ \text{result} = \text{result xor do\_hash}((S_{A7}, S_{A6}, S_{A5}, S_{A4}), K); \\ \text{result} = \text{result xor do\_hash}((S_{A3}, S_{A2}, S_{A1}, S_{A0}), K); \\ \text{result} = \text{result xor do\_hash}((D_{A0}, D_{A15}, D_{A14}, D_{A13}), K); \\ \text{result} = \text{result xor do\_hash}((D_{A12}, D_{A11}, D_{A10}, D_{A9}), K); \\ \text{result} = \text{result xor do\_hash}((D_{A8}, D_{A7}, D_{A6}, D_{A5}), K); \\ \text{result} = \text{result xor do\_hash}((D_{A4}, D_{A3}, D_{A2}, D_{A1}), K); \end{array}\right\} 1410$$

again where do_hash(D, K) is a 32 bit hash algorithm operating on 32 bit input data D using the 32 bit hash key K.

FIG. 14

METHOD AND SYSTEM FOR PERFORMING FLOW BASED HASH TRANSFORMATION TO GENERATE HASH POINTERS FOR A NETWORK DEVICE

TECHNICAL FIELD

The present invention relates generally to digital communication on networked digital computer systems and communication system networks. More specifically, the present invention pertains to address indexing and digital communications network protocols.

BACKGROUND ART

The use of network based electronic communications and information processing systems for information control and information retrieval has rapidly proliferated in modern business environments. Within a typical enterprise, hundreds of client computer systems and server computer systems are constantly accessed by hundreds, or even thousands, of users for obtaining company information, news, competitive information, training materials, and the like, via one or more company wide LANs (local area networks) or WANs (wide area networks), or via the networked resources of the vast communications network known as the Internet.

Generally, digital communications networks (e.g., LANs, WANs, the Internet, etc.) are packet switched digital communications networks. As used generally, the term network refers to a system that transmits any combination of voice, video and/or data between users. The network includes the underlying architecture of connected clients and servers and their associated software (e.g., network operating system in the client and server machines, the cables connecting them and the supporting hardware, such as hubs, switches, routers, etc.). Packet switching refers to subdividing data comprising a message into a number of smaller units of data, or packets, and routing the packets individually through a number of nodes of the communications network.

The nodes of the digital communications network are generally made up of servers, clients, NOS (network operating system) services and supporting hardware. Servers are typically high-speed computer systems that hold programs and data or perform services that are shared by network users (e.g., the clients). The clients (e.g., desktop computer systems, workstations, and the like) are typically used to perform individualized, stand-alone processing and access the network servers as required. The actual communications path hardware is the cable (twisted pair, coax, optical fiber) that interconnects each network adapter. In wireless systems such as WLANs (wireless LANs) and the like, antennas, access point devices, and towers are also part of the network hardware.

Data communications within a network is generally managed by a one of a number of protocols such as, for example, TCP/IP, IPX, or the like. The physical transmission of data is typically performed by the access method (Ethernet, Token Ring, etc.) which is implemented in the network adapters that are plugged into the computer systems. The standardized communications protocols enable the widespread interoperability of communications networks and the widespread exchange of business related information.

In a large enterprise network or on the Internet, the Internet Protocol (IP) is used to route the packets among the various nodes or from network to network. Routers contain routing tables that move the datagrams (e.g., frames, packets, or the like) to the next "hop", which is either the destination network or another router. In this manner, packets can traverse several routers within an enterprise and a number of routers over the Internet.

Routers inspect the network portion (net ID) of the address and direct the incoming datagrams to the appropriate outgoing port for the next hop. Routers move packets from one hop to the next as they have routing information to indicate the most efficient path that a packet should take to reach it's destination. Eventually, if the routing tables are correctly updated, the packets reach their destination. Routers use routing protocols to obtain current routing information about the networks and hosts that are directly connected to them.

In a manner similar to routers, many modern switches now include routing functionality. Such routing switches, as with routers, function by forwarding data packets from one local area network (LAN) or wide area network (WAN) to another. Based on routing tables and routing protocols, switches/routers read the network address in each transmitted frame and make a decision on how to send it based on the most expedient route (traffic load, line costs, speed, bad lines, etc.). These network addresses include both a MAC address (media access control address) and an IP address (Internet protocol address).

The routing tables are indexed with respect to the addresses of the various nodes of the communications network. These addresses are used to route the packets to the required destination. Since each component on the network has its address, the resulting address space can be extremely large and unwieldy. Large data spaces can be difficult to work with within high-speed router/switches. The problem is even more pronounced with the routers operating at the core of the extremely large networks many enterprises are building, and with routers functioning near the core of the Internet. The resulting address space can span many hundreds of megabytes of memory. To manage the large address space, many prior art address space hashing schemes have been developed.

Address space hashing has become a widely used method to reduce the huge addressing space of a large network to a small, relatively inexpensive, memory table. Due to the fact that the majority of installed networks are based upon Ethernet protocols, many different types of Ethernet MAC address hashing-based address handling methods have been implemented. For example, when a packet arrives at a switch or router, it will need a destination address (DA) lookup to forward the packet, and possibly also a source address (SA) lookup to learn or authenticate the sending station. The network addresses will be used to generate hashing pointers, which are normally around 10–20 bits depending on table size.

The hashing pointer is generated using a hash function, wherein a hash function H can be described as a transformation that takes a variable-size input m (e.g., 48-bit MAC SA/DA), and a variable-size key k, and returns a fixed-size hash value "h" (e.g., hashing pointer), h=H(m, k). Each hashing pointer references a block of memory containing one or multiple MAC entries. Each entry stores the whole 48-bit MAC address and a switching tag related to this address. This entry contains information such as the next-hop forwarding data (the switch port(s) to forward the packet to, destination MAC address, destination VLAN, etc.), packet priority, etc.

When table referencing happens, the MAC address/addresses from the valid entry/entries under the hashing pointer will be compared against the original MAC address and a hit/miss or known/unknown decision will be made accordingly for the DA or SA lookup. Any further decisions based upon forwarding/learning etc., will be made based on the table search results and system setup. The goal of the system is to reduce the address size from a very large block (e.g., 48 bits or more) to a smaller more manageable block (e.g., 10–20 bits), while avoiding address aliasing, where two or more addresses generate a common hash pointer (e.g., a conflict or collision).

Hashing conflicts/collisions have a very adverse effect on the performance of the network router/switch. The hardware of the router/switch is optimized to perform the hashing address space translation very rapidly. In the event of a collision, either a new hash pointer is computed with a different key k (which consumes additional memory bandwidth) or a software based error handling routine is used to resolve the address aliasing. The software based routines execute much more slowly than the normal forwarding hardware. Thus, it becomes critical to network performance that the switch/router implement a fast and efficient address space hashing table.

One prior art solution to this problem involves use of an exceptionally large hashing pointer. For example, for a 48-bit input, a 24-bit hashing pointer can be implemented as opposed to, for example, a smaller 10-bit hashing pointer. The 24-bit hashing pointer reduces the likelihood of collisions as addresses are transformed from 48 to 24-bits as opposed to 48 to 10-bits. Unfortunately, the 24-bit hashing pointer results in a larger routing table (e.g., $2^{24}$ number of entries) which requires more memory and hence increases cost.

Another prior art solution is the use of a sophisticated hashing function for resolving the hash pointer. For example, a sophisticated hashing function can be designed to use each and every bit of a 48-bit input to generate a resulting 10–12-bit hashing pointer. The function can be configured to give a very high likelihood of different addresses transforming to different hashing pointers. Unfortunately, sophisticated and overly complicated hashing functions can be very difficult to implement in hardware. This can be even more problematic when the switch/router is designed to function at high-speed, wherein table lookups and routing decisions have to be made within a very small number of clock cycles.

Both of the above prior art solutions are increasingly outmoded, as the address spaces which are required to be efficiently indexed and tabled grow increasingly large. For example, newer versions of the Internet protocol (e.g., IPv6) will use 128-bit IP addresses. Thus, prior art type sophisticated hashing functions designed to use each and every bit of a 128-bit input to generate a hashing pointer become extremely difficult to implement using high-speed hardware. Similarly, prior art techniques using relatively large hashing pointers with respect to a 128-bit input require too much memory to implement cost-effectively.

Thus, the prior art is problematic in that conventional address space hashing schemes have difficulty scaling efficiently to large address spaces. Prior art address space hashing schemes have difficulty transforming input addresses into hashing pointers at high speed without increasing the number of conflicts/collisions which occur. Additionally, prior art address space hashing schemes that may have sufficient conflict/collision performance are difficult to efficiently implement in high-speed hardware. The present invention provides a novel solution to these problems.

DISCLOSURE OF THE INVENTION

A method for performing flow based address hash transformation in a network device to generate hash pointers is disclosed. The method includes the steps of receiving a pair of addresses (e.g., source address input and destination address input) corresponding to one direction of a data flow. The destination address input is modified by using a rotation operation. Respective hash operations are subsequently performed on the source address input and modified destination address input. The rotation operation performed on the destination address input prevents aliasing between the hash results for the forward direction of a data flow and the reverse direction, thereby preventing hash pointer collisions.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 6 shows a pseudo code representation of the logic function performed by a result combination unit in accordance with one embodiment of the present invention.

FIG. 13 shows a pseudo code representation of a first parallel hash system optimized for flow based address hash transformation in accordance with one embodiment of the present invention.

FIG. 14 shows a pseudo code representation of a second parallel hash system optimized for flow based address hash transformation in accordance with one embodiment of the present invention.

BEST MODES FOR CARRYING OUT THE INVENTION

Embodiments of the present invention provide an address space hashing solution that can scale effectively to large address spaces. In addition, embodiments of the present invention implement an address space hashing method and system that transforms input addresses into hashing pointers while reducing the number of conflicts/collisions which occur. Furthermore, the address space hashing method and system can be efficiently implemented in high-speed hardware.

Figure 1:
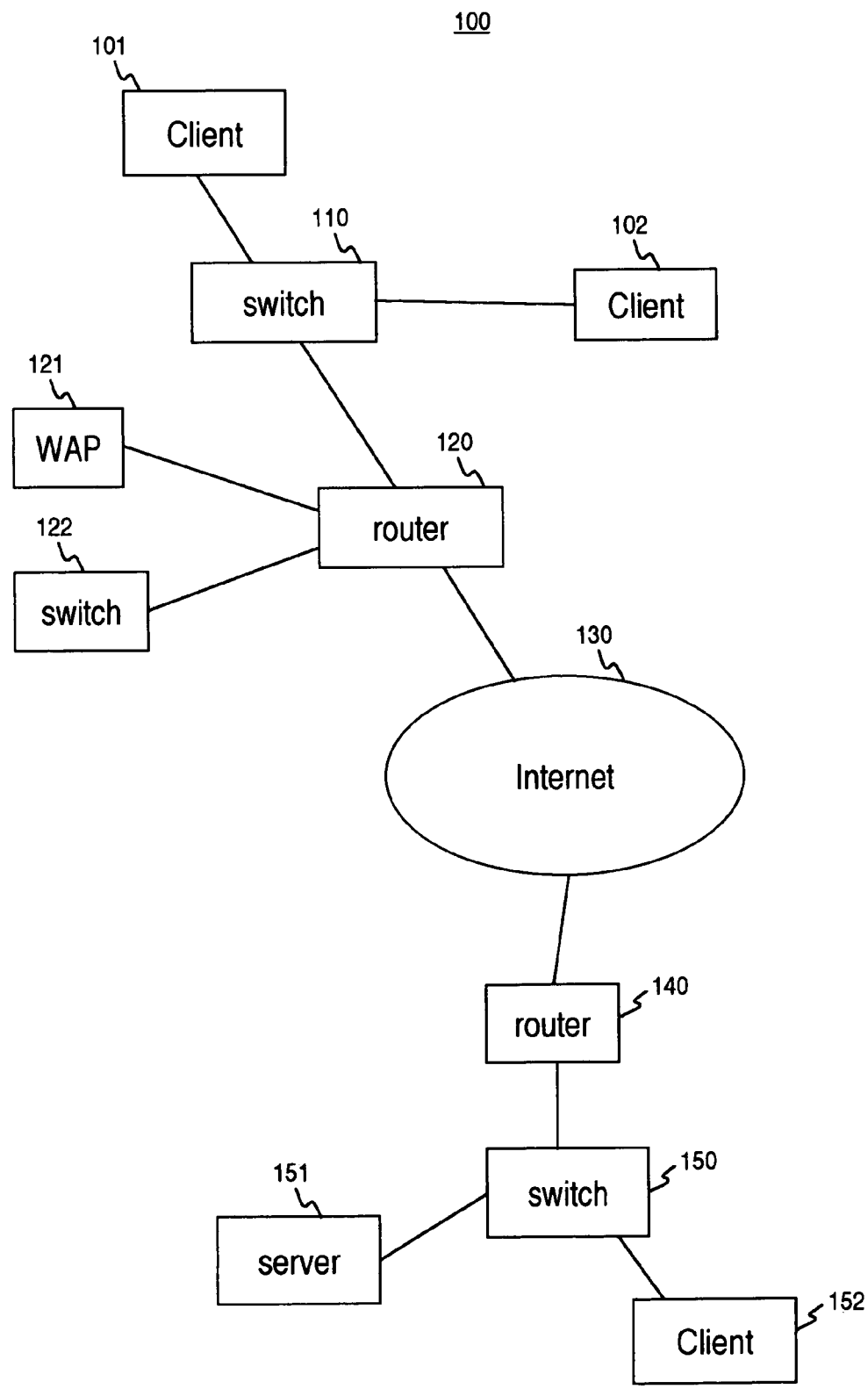
FIG. 1 shows a diagram of a network system in accordance with one embodiment of the present invention.

Referring now to FIG. 1, a network system 100 in accordance with one embodiment the present invention is shown. As depicted in FIG. 1, system 100 shows a router 120 and a switch 110 coupled to the Internet 130, in conjunction with router 140 and switch 150. These components comprise nodes which perform packet forwarding in accordance with embodiments of the present invention.

Referring still to FIG. 1, a client 101 and a client 102 are coupled to switch 110 to receive and transmit information to the network of system 100. Packets from client 101–102 are transmitted and received through switch 110 and via router 120. Based upon the address of the packets (e.g., MAC addresses, IP addresses), the router 120 routes them to and from their required destination. For example, packets from client 101 can be routed to wireless access port 121 for communication with mobile users, or can be routed to switch 122 for communication with other clients connected to switch 122, etc. Similarly, packets from client 101 can be routed to other destinations across the Internet 130, such as, for example, a server 151 or client 152. In this example, the packets would be forwarded through router 140, switch 150, and into server 151.

Accordingly, router 120 and router 140 perform packet and/or frame router functions (e.g., forwarding data packets or frames from one local area network (LAN) or wide area network (WAN) to another). Router 120 and router 140 maintain internal routing tables, which, in conjunction with standardized routing protocols, allow for storing the network address in each transmitted frame and make a decision on how to send it based on the most expedient route (traffic load, line costs, speed, bad lines, etc.).

In the present embodiment, routers 120 and 140, and switches 110, 122, and 150 are generally specialized hardware that is optimized for packet switched communications. However, this functionality can also be implemented in software on a general purpose computer having the necessary LAN and/or WAN interface(s).

Referring still to FIG. 1, router 120 functions by examining the packets coming from client 101 to determine the routing port for transmitting packets to and from client 101. In determining the routing port, the router 120 will perform a destination address (DA) lookup to forward the packet, and may also perform a source address (SA) lookup to learn or authenticate the sending client, in this case client 101. In accordance with embodiments of the present invention, router 120 will use the destination IP address to generate a hashing pointer and use this hashing pointer to reference its internal hashing table. Each hashing pointer references a block of memory containing one or multiple IP entries (e.g., addresses). The entries are configured to map to the ports of the router 120 and are used by the router 120 to determine which port to forward the packet through.

In the present embodiment, to speed the routing process for the packets, router 120 implements a method for performing parallel hash transformations on the MAC SA/DA addresses and on the IP source and destination addresses received from the various connected clients. The hash transformations are used to generate a hash pointer for each address input.

Figure 2:
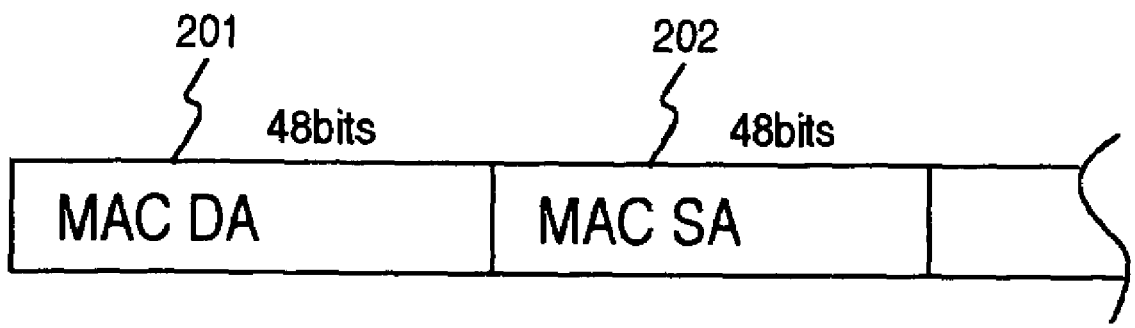
FIG. 2 shows a diagram of a 48-bit MAC destination address and a 48-bit MAC source address in accordance with one embodiment of the present invention.

FIG. 2 shows a diagram of a 48-bit MAC destination address 201 and a 48-bit MAC source address 202 as operated on by embodiments of the present invention. As depicted in FIG. 2, the 48-bit MAC SA/DA comprise the header of the data packet, referred to as a frame in an Ethernet based network. As known by those skilled in the art, the 48-bit MAC SA/DA comprise the hardware addresses of the various nodes connected to the network. For example, the network interface card of client 101 and client 102 (shown in FIG. 1) will have their own respective MAC addresses. These addresses are used by switch 110 to determine where to forward the Ethernet frames.

Figure 3:
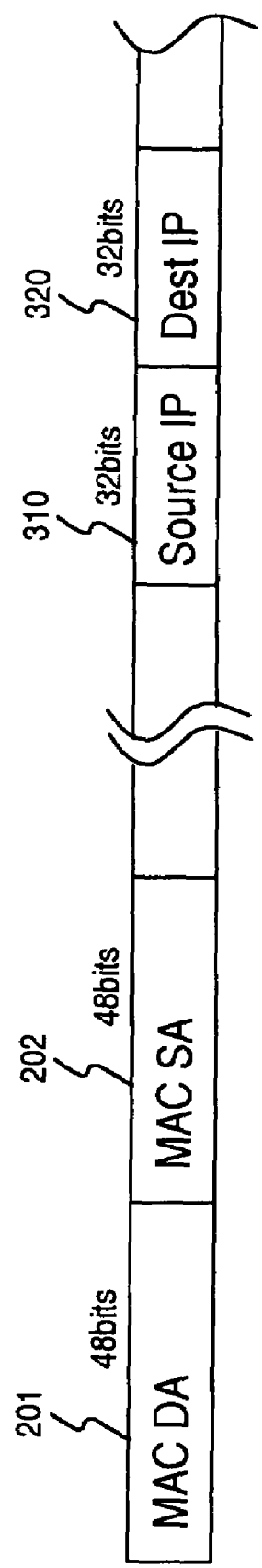
FIG. 3 a diagram of a 48-bit MAC destination address and a 48-bit MAC source address, in conjunction with a 32-bit source IP address and a 32-bit destination IP address in accordance with one embodiment of the present invention.

FIG. 3 shows a diagram of a 48-bit MAC destination address 301 and a 48-bit MAC source address 302, in conjunction with a 32-bit source IP address 310 and a 32-bit destination IP address 320, as operated on by embodiments of the present invention. FIG. 3 shows a case where an Ethernet network (e.g., using layer 2 MAC SA/DA addresses) is used to support TCP/IP networking protocols, wherein sources and destinations are specified using IP addresses 310 and 320. As shown in FIG. 3, the IP addresses 310 and 320 are included within the frame after the MAC SA/DA addresses 201 and 202.

Figure 4:
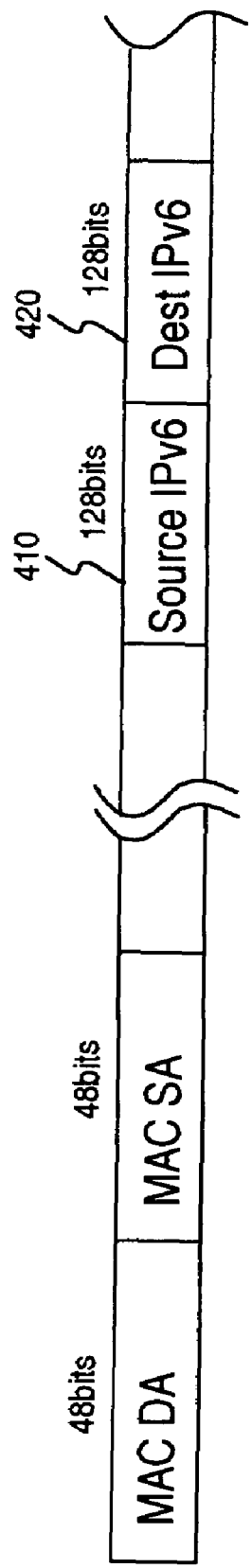
FIG. 4 shows a diagram of a 128-bit source IP address and 128-bit destination IP address in accordance with one embodiment of the present invention.

FIG. 4 shows a diagram of a 128-bit source IP address 410 and 128-bit destination IP address 420 as operated on by embodiments of the present invention. In this case, the frame is in accordance with version 6 of Internet protocols (e.g., IP version 6, or IPv6). In order to expand the number of Internet addresses available, as known by those skilled in the art, IPv6 addresses are 128 bits in length. In all other respects, frames are transmitted between network nodes in the same manner as for IPv4 addresses.

Figure 5:
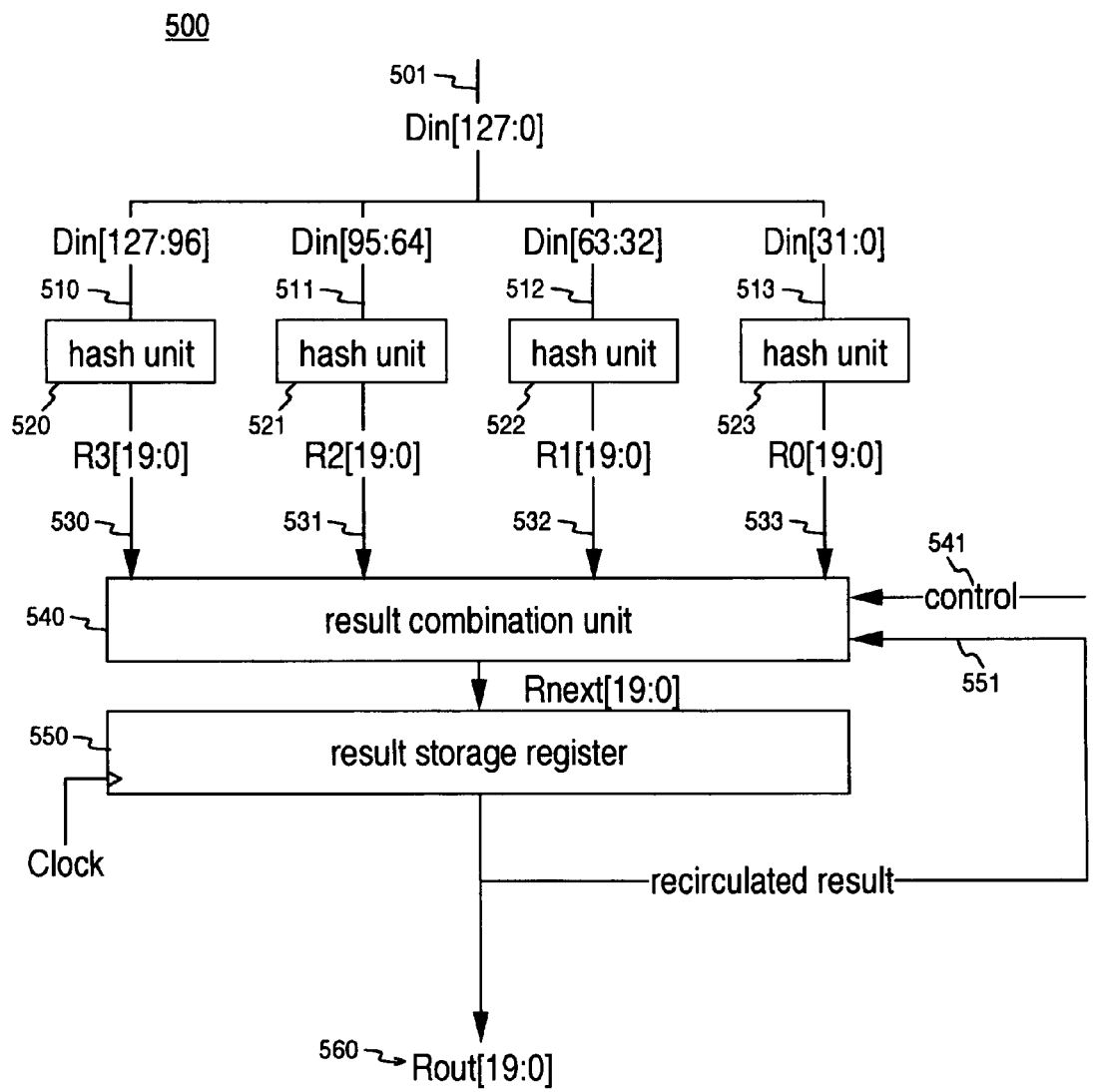
FIG. 5 a diagram of a parallel hashing system in accordance with one embodiment of the present invention.

FIG. 5 shows a diagram of a parallel hashing system 500 in accordance with one embodiment of the present invention. As depicted in FIG. 5, the hashing systems 500 includes four parallel hash units 520–523 configured to execute hash transformations on an address input in parallel. In this embodiment, system 500 operates on an input address of up to 128 bits (e.g., an IPv6 address input).

The hashing system 500 is implemented within network devices, for example, switch 110, router 120, router 140, and the like, in order to perform high-speed efficient forwarding in accordance with the present invention. The parallel hash units 520–523 are coupled to receive respective portions 510–513 of the 128-bit data input 501 as shown. The hash units 520–523 execute their respective hash transformations in parallel to generate the resulting outputs 530–533. The outputs 530–533 are received by a result combination unit 540 which functions by recombining the outputs to obtain a 20-bit hash result 560 as shown.

In this manner, system 500 of the present embodiment provides an address space hashing solution that can scale effectively to large address spaces. By breaking down the hash generation into parallel execution units 520–523, the hash transformations can be performed on the large address input (e.g., 128-bit) much more quickly than attempting to perform a single monolithic hash transformation on the large address input using a single large hash unit. Parallel execution is much faster.

The parallel hash transformation of the present embodiment also provides an address space hashing solution that transforms input addresses into hashing pointers while reducing the number of conflicts/collisions which occur.

Dividing the large address input into multiple hash unit inputs allows for more sophisticated hash algorithms to be implemented, whereby the hash result 560 is influenced by a greater proportion of the bits of the address input 501. Parallel execution allows more logical operations to be run on the bits comprising the address input 501.

Yet another advantage provided by system 500 of the present embodiment is the fact that parallel hash unit execution can be efficiently implemented in high-speed hardware. By dividing the large address input 501 amongst multiple hash execution units 520–523, the number of logic gates which a signal must cascade through remains limited in comparison with, for example, prior art monolithic, non-parallel schemes. Consequently, signal propagation through the parallel hash execution units of system 500 allow for very high-speed operation. For example, embodiments in accordance with system 500 can generate the hash result 560 from the address input 501 within a single clock cycle (e.g., 5 ns or less). Accordingly, system 500 can be integrated into a single ASIC.

It should be noted that system 500 of the present embodiment can be implemented, in whole or in part, in software executing on one or more digital processors. For example, the parallel execution units 520–523 can be implemented as parallel execution threads which can be distributed across parallel processors of a computer system. In such embodiment, it is desired that the hash execution is implemented in parallel, and as such, software for doing so can be distributed amongst computer system platforms or amongst processors of a single computer system.

Referring still to FIG. 5, in the present embodiment, the result storage register 550 functions by allowing system 500 to accept successive 128-bit address inputs and generate a corresponding hash result 560. The result storage register 550 thus allows system 500 to operate on even wider address inputs (e.g., 256 bit). The result storage register 550 utilizes a recirculate result path 551, in conjunction with a control input 541, to recombine a previous result with a next result. This allows system 500 to perform hash transformations on wider inputs over multiple clock cycles. For example, system 500 can take a 128-bit address input and generate a resulting 20-bit hash result in one clock cycle, or alternatively, using the result storage register 550, system 500 can take 256 bits of address input data over two clock cycles and combine them into a single 20-bit result. The pseudocode for the result combination unit is shown in FIG. 6.

FIG. 6 shows a pseudo code representation of the result combination unit 540 of FIG. 5. As shown in FIG. 6, when control input 541 is assigned to zero, the recirculate result 551 is disabled, and the resulting output 560 is an XOR of the outputs of the hash units 520–523 (e.g., R3, R2, R1, and R0). When control input 541 is assigned to one, the recirculate result 551 is enabled, and the resulting output 560 is an XOR of the outputs of the hash units 520–523 and the recirculate result Rout 560 (e.g., R3, R2, R1, R0, and Rout).

It should be noted that embodiments of the present invention can use other types of logic to implement the hash functions of the hash units 520–523 besides XOR. The parallel hash transformation aspect of the present invention provides enough performance margin to implement more complex hash functions.

Additionally, it should be noted that embodiments of the present invention can operate in conjunction with other types of address inputs besides 128-bit address inputs. For example, embodiments of the present invention can operate with address data that is less than 128 bits, with the unused bits being set to 0. Examples include 48-bit MAC addresses, 32-bit IPv4 addresses, and the like. Similarly, embodiments of the present invention can utilize greater or lesser degrees of parallel execution. For example, also system 500 utilizes four parallel hash units, other numbers of parallel hash units can be implemented (e.g., 2, 8, 10, etc.).

Figure 7:
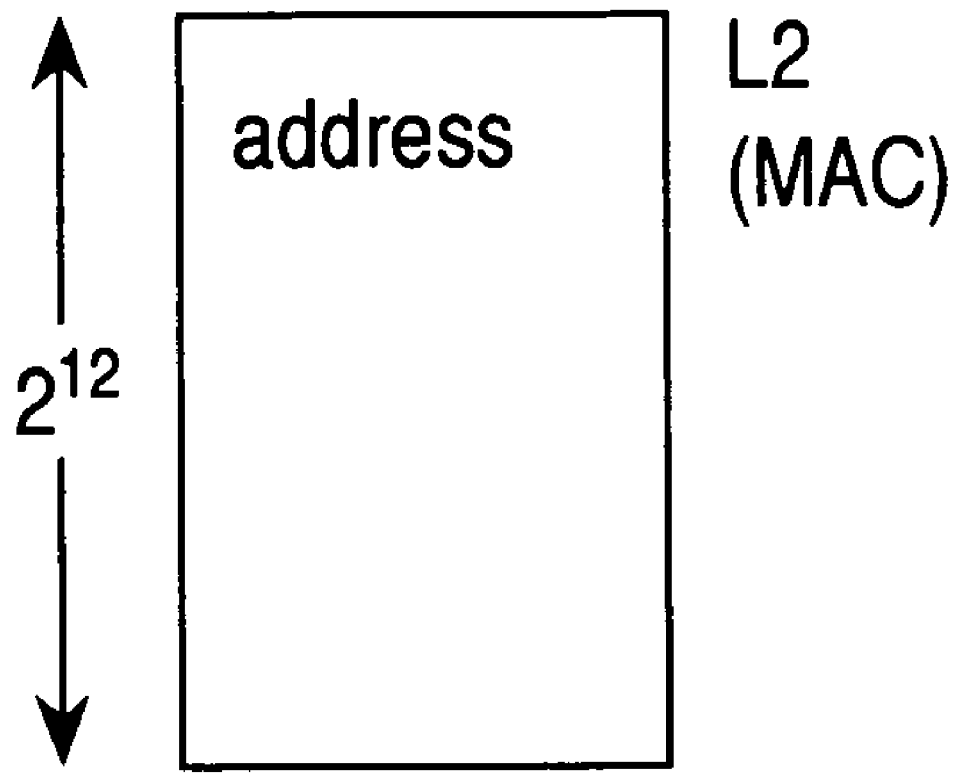
FIG. 7 shows a routing table of 12-bit hash pointers generated from a 48-bit address input in accordance with one embodiment of the present invention.
Figure 8:
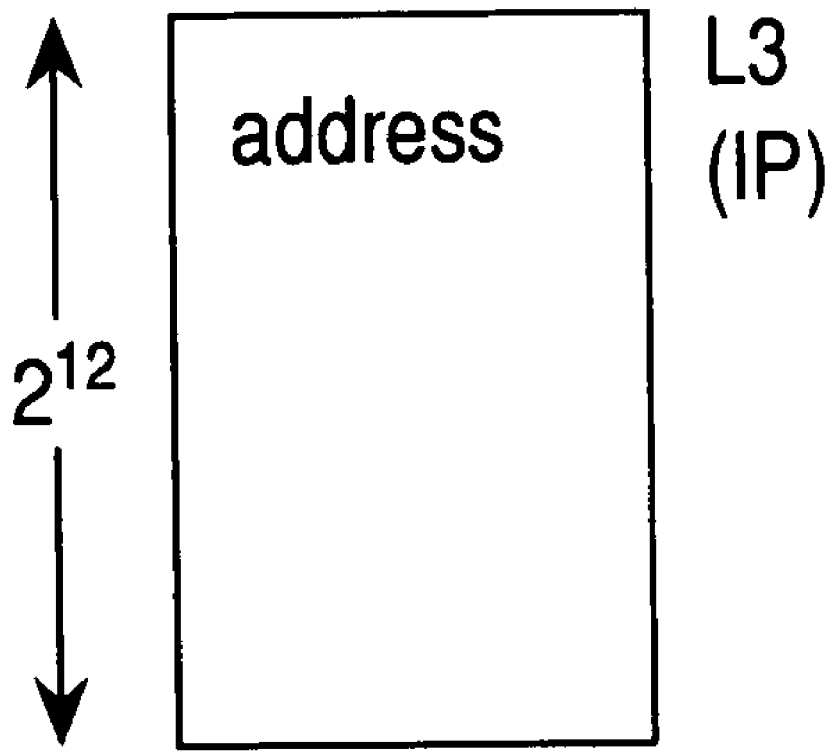
FIG. 8 shows a routing table of 12-bit hash pointers generated from a 32-bit IP address input in accordance with one embodiment of the present invention.
Figure 9:
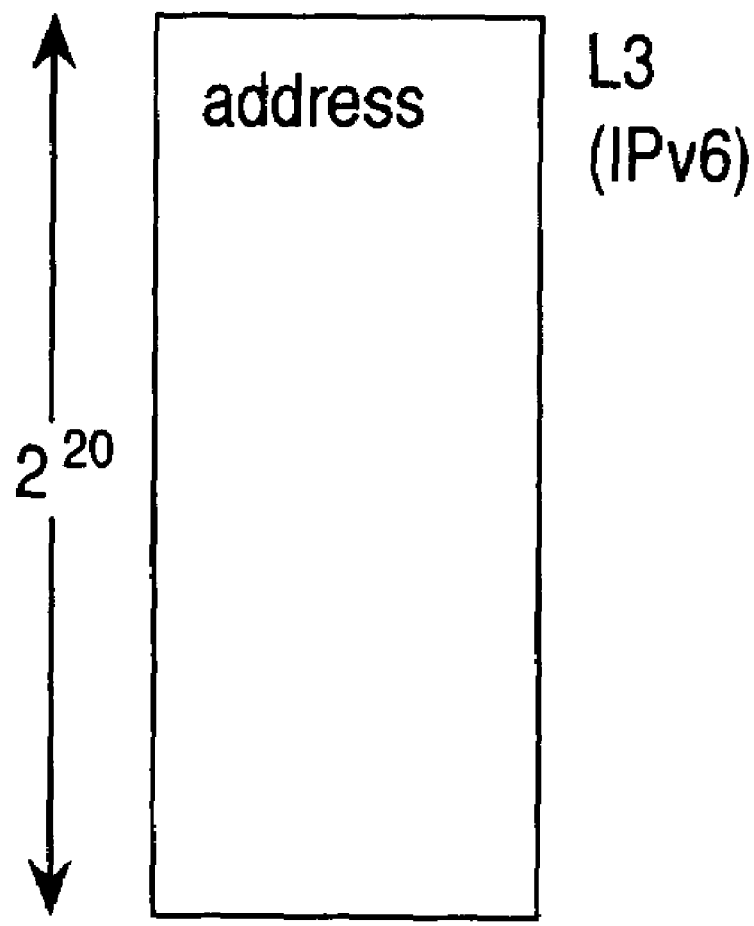
FIG. 9 shows a routing table of 20-bit hash pointers generated from a 128-bit IP address input in accordance with one embodiment of the present invention.

FIG. 7, FIG. 8, and FIG. 9 show routing tables generated by systems in accordance with the present invention. FIG. 7 shows a routing table 700 of 12-bit hash pointers generated from a 48-bit address input. As depicted in FIG. 7, the routing table 700 has $2^{12}$ entries for 48-bit MAC addresses as used in layer 2 switching.

FIG. 8 shows a routing table 800 of 12-bit hash pointers generated from a 32-bit IP address input. As with routing table 700 of FIG. 7, routing table 800 has $2^{12}$ entries for 32-bit IP addresses used in layer 3 IP routing.

FIG. 9 shows a routing table 900 of 20-bit hash pointers generated from a 128-bit IP address input. As depicted in FIG. 9, the routing table 900 has $2^{20}$ entries for 128-bit addresses used in the IPv6 routing protocols (layer 3).

Figure 10:
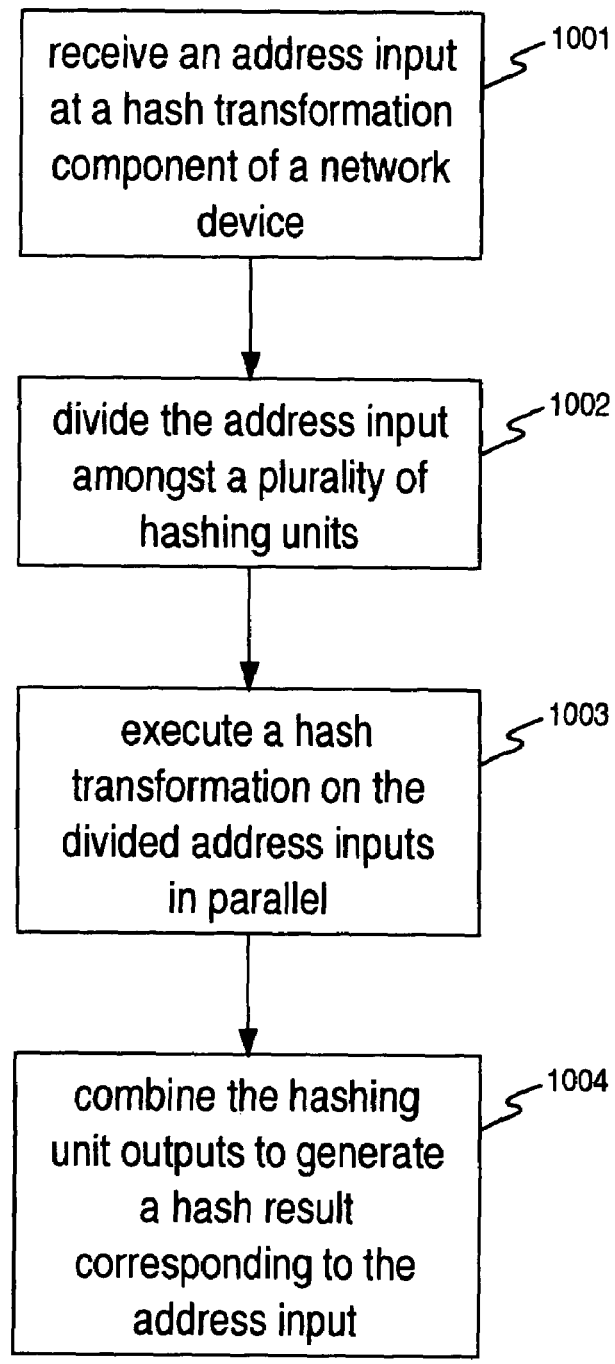
FIG. 10 shows a flowchart of the steps of a parallel hash generation process in accordance with one embodiment of the present invention.

FIG. 10 shows a flowchart of the steps of a process 1000 in accordance with one embodiment of the present invention. As depicted in FIG. 10, process 1000 shows the operating steps involved in a parallel hash transformation operation as performed when transforming packet address inputs into hash pointer outputs.

Process 1000 begins in step 1001 where an address input (e.g., 128-bit address input, etc.) is received at a hash transformation component of a network device. The hash transformation component functions by generating hash results from the address inputs. The hash results, in this case hash pointers to a forwarding table, are used by the network device (e.g., a switch or router) to forward packets or frames along the network. In step 1002, the address input is divided amongst a plurality of hashing units. For example, as described above, in a case where four parallel hash units are used to process a 128-bit address input, the 128-bit address input is divided into respective 32-bit inputs for the hash units. In step 1003, the hash units execute a hash transformation on the divided address inputs in parallel. Subsequently, in step 1004, the hashing unit outputs are combined to generate a hash result corresponding to the address input.

Figure 11:
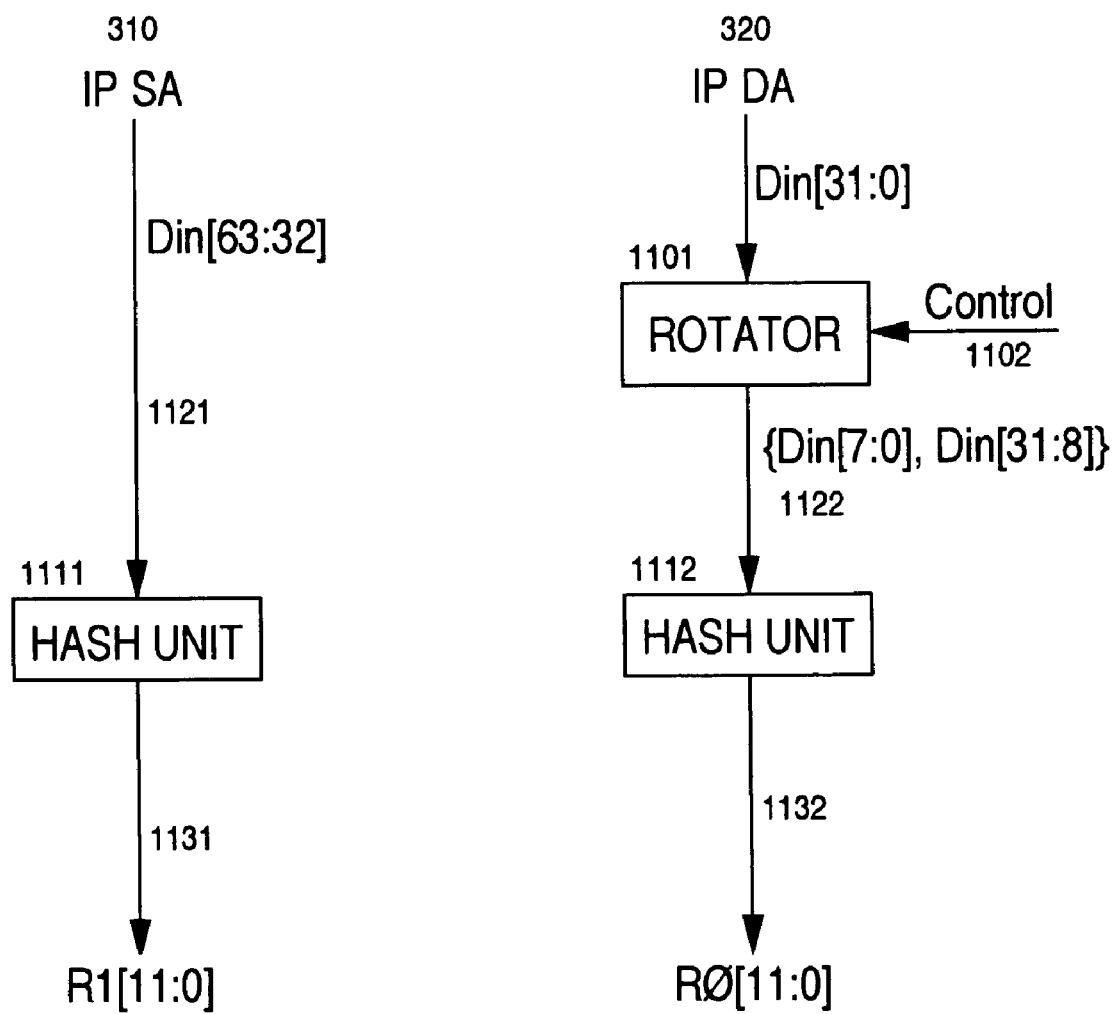
FIG. 11 shows a first parallel hash system optimized for flow based address hash transformation in accordance with one embodiment of the present invention.

Referring now to FIG. 11, a parallel hash system 1100 in accordance with one embodiment of the present invention is shown. System 1100 shows the components of a hash system optimized to perform flow based address hash transformation.

In the present embodiment, system 1100 includes a rotator 1101 configured to modify the IP destination address 320 (e.g., IP DA 320). The IP destination address is modified by the rotator 1101 prior to being passed to the parallel hash unit 1112. The IP source address 310 (e.g., IP SA 310) is directly coupled to the parallel hash unit 1111 without modification. The parallel hash unit 1111 performs a hash operation, in the manner described above, on the unmodified IP source address 310. Similarly, the parallel hash unit 1112 performs a hash operation on the modified IP destination address 320. The hash unit outputs 1131–1132 are then respectively combined to produce a corresponding 12 bit hash result (e.g., IP flow hash pointer). In this embodiment, the IP destination address 320 is modified by using a rotation operation performed by the rotator 1101.

Rotation of the IP destination address prior to hashing is used by system 1100 to prevent hash pointer conflicts/collisions when flow based routing is implemented. Flow based routing characterizes data flow between two nodes by using the addresses of each node (e.g., the IP address of the sending node and the IP address of the receiving node). Data flow generally occurs in both directions, e.g., between client 102 (data requests) and server 151 (returned data) (shown in FIG. 1). Routers analyze the data flowing in both directions between client 102 and server 151 in order to achieve flow based routing in both directions. Thus, hash pointers derived from the addresses (e.g., IP DA 320 and IP SA 310) need to resolve into separate and distinct values for each of the two directions that the data packets are flowing.

Referring still to FIG. 11, the hashing pointers are used to perform a flow-based lookup in the routing tables to characterize a connection between two devices, for example client 102 and server 151. The hashing pointer generation depends on the addresses of both devices. As described above, the addresses are typically either IPv4 addresses (each 32 bits), IPv6 addresses (each 128 bits) or a combination of the IP addresses with TCP or UDP port numbers (each 16 bits). System 1100 shows a case where two 32 bit (e.g., IPv4) addresses are handled. Given the IP source address 310 and the IP destination address 320, it is preferable that the hash result for each direction of the flow is different, otherwise a collision/conflict results. In general, for a hashing algorithm H, it is desired that H(SA, DA) is not equal to H(DA, SA).

In accordance with the present embodiment, even though the source address and destination address are hashed separately in separate parallel hash units, the hash results for different flow directions will not resolve to a common value. Some implementations of separate hashing can be particularly susceptible to generating collisions due to the fact that source addresses and destination addresses are often hashed independently and combined using an unsophisticated logical operation (e.g., XOR). The reasoning is shown in the relationship below where:

if H(X, Y) is subdivided and generated according to h(X) XOR h(Y), then H(SA, DA)=h(SA) XOR h(DA)=h(DA) XOR h(SA)=H(DA, SA).

The system 1100 embodiment avoids generating collisions by modifying either the source address input data or the destination address input data prior to the hash generation. The input data is modified before generating the original inputs to the hashing algorithms (e.g., parallel hash units 111–1112) such that the subdivision and separate, parallel, execution does not result in the source address and destination address being resolved to a common value. The system 1100 embodiment uses the rotator 1101 to rotate the destination address IP DA 320 right by 1 byte (8 bits) before being applied to the hashing process (hash unit 1112) as input data 1122. This is achieved by setting the control input 1102 of rotator 1101 to logic 1. Once the destination address has been rotated, the hash results are generated in the manner described above (e.g., parallel hash execution, combination, and the like).

Figure 12:
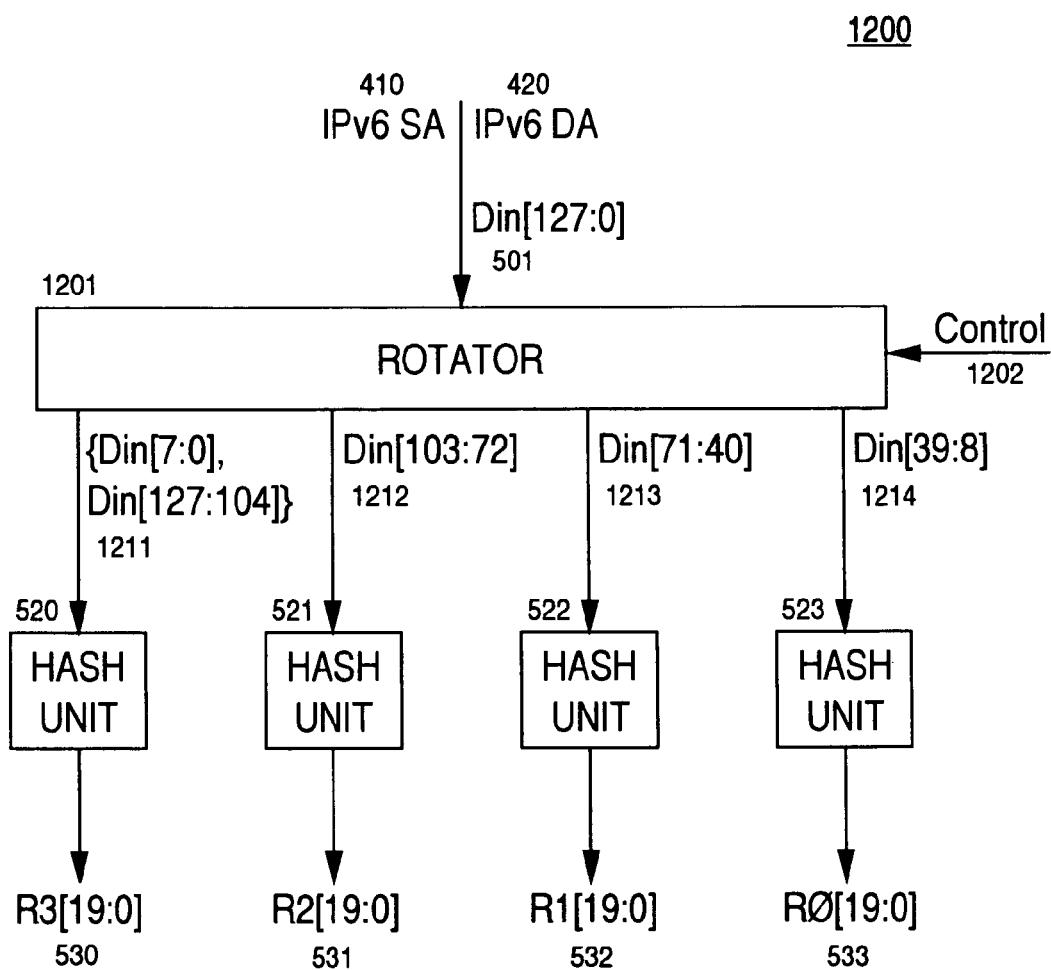
FIG. 12 shows a second parallel hash system optimized for flow based address hash transformation in accordance with one embodiment of the present invention.

FIG. 12 shows a parallel hash system 1200 in accordance with one embodiment of the present invention. System 1200 shows the components of a hash system optimized to perform flow based address hash transformation on 128-bit IPv6 addresses.

In the system 1200 embodiment, a rotator 1201 is configured to modify a 128-bit IPv6 address using rotation in a manner similar to system 1100 of FIG. 11. The IP address can be either a 128-bit IPv6 source address 410 or a 128-bit IPv6 destination address 420. The 128-bit IP destination address input is modified using a rotation operation (by setting the control input 1202 of rotator 1201 to logic 1) before being passed to the parallel hash units 520–523 as input data 1211–1214. The parallel hash units 520–523 perform a parallel hash operation on the entire 128-bit input, in the manner described above in the discussion of FIG. 5. The hash unit outputs 530–533 are then respectively combined to produce corresponding 20 bit hash. In this embodiment, the IPv6 destination address 420 (or IPv6 source address 410) is modified by using a rotation operation performed by the rotator 1201. As with system 1100 of FIG. 11, system 1200 avoids generating collisions by modifying either the source address input data or the destination address input data prior to the hash generation. Referring now to FIG. 13 and FIG. 14, respective pseudo code representations of the processes implemented by system 1100 and system 1200 are shown. FIG. 13 shows a pseudo code representation of a 32 bit IP address flow based hash process (e.g., system 1100). FIG. 14 shows a pseudo code representation of a 128-bit IP address flow based hash process (e.g., system 1200). Referring to FIG. 13, line 1301 shows the IP source address being initialized in an unchanged condition, as it is received. Line 1302 shows the IP destination address being rotated right by 1 byte (corresponding to data input 1122 of FIG. 11). Line 1303 shows the subsequent hash operation being performed on both the IP source address and the modified IP destination address. Referring to FIG. 14, the bracket indicated by line 1410 points out the 8 hash operations which have the effect of implementing an 8-bit rotation while also performing a hash operation on the IPv6 destination address with a 32 bit key.

Figure 15:
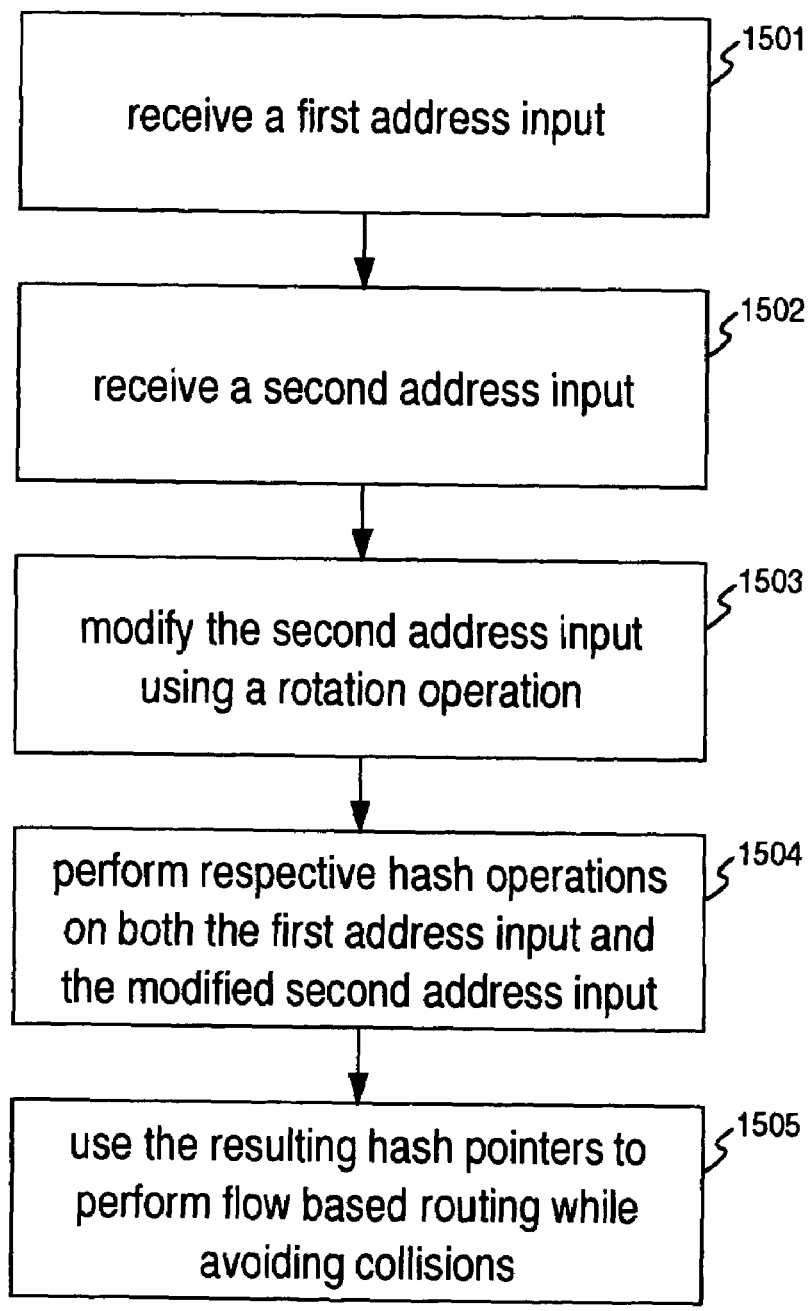
FIG. 15 shows a flow chart of the steps of a flow based address hash transformation process in accordance with one embodiment of the present invention.

FIG. 15 shows a flow chart of the steps of a process 1500 in accordance with one embodiment of the present invention. Process 1500 depicts the steps involved in a flow based address hash transformation as implemented by a parallel hash execution system (e.g., system 1100 of FIG. 11).

Process 1500 begins in step 1501, where a first address input is received. In step 1502, a second address input is received. The first and second address inputs can be a source address and a destination address respectively, or vice versa. In step 1503, the second address (e.g., the destination address) is modified using a rotation operation. As described above, the rotation operation rotates the second address by, for example, 8-bit positions. In step 1504, respective hash operations are performed on both the first address input and the modified second address input. As described above, once the parallel hash execution units produce their respective outputs, the outputs are combined to produce the overall hash result, or hash pointer. In step 1505, the resulting hash pointer is used to perform flow based routing while avoiding collisions due to input addresses aliasing.

Thus, a method and system for performing flow based hash transformation to generate hash pointers for a network device has been described. The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order best to explain the principles of the invention and its practical application, thereby to enable others skilled in the art best to use the invention and various embodiments with various modifications as are suited to the particular use contemplated. It is intended that the scope of the invention be defined by the claims appended hereto and their equivalents.

What is claimed is:

1. A method for performing flow based address hash transformation in a network device to generate hash pointers, comprising:

receiving a first address input and a second address input, wherein the first address input and second address input include a respective source address and destination address;

modifying the second address input using a rotation operation on the source address of the second address input; and performing a hash operation on the first address input and the modified second address input wherein the rotation operation prevents hash pointer collisions between a forward flow and a reverse flow between the first address input and the second address input.

2. The method of claim 1 further comprising:

modifying the second address input by using a rotation operation on the destination address of the second address input.

3. The method of claim 1 wherein the forward flow includes data flowing from a first client to a second client and the reverse flow includes data flowing from the second client to the first client.

4. The method of claim 3 wherein the hash operation on the first address input and the modified second address input generate a hash result that is used for flow based routing in the network device.

5. The method of claim 1 wherein the first address input and the second address input are 128-bit address inputs.

6. The method of claim 1 wherein the forward flow and the reverse flow comprise flows in a first direction between the first address input and the second address input, and a second direction between the first address input and the second address input.

7. The method of claim 1 wherein the first address input and the second address input are 32 bit address inputs.

8. A system for performing flow based address hash transformation in a network device to generate routing table entries, comprising:

an input for receiving a first address and a second address corresponding to a first data flow, wherein the first address and the second address comprise a source address and a destination address;

a rotator unit coupled to the input, the rotator unit configured to modifying the source address by using a rotation operation;

a hash unit coupled to the rotator unit to receive the first address and the modified second address, the hash unit configured to perform hash operations on the first address input and the modified second address input wherein the rotation operations prevent aliasing between a hash result for the first data flow and a hash result for a second data flow in an opposite direction of the first data flow; and an output coupled to the hash unit to output hash results of the hash operations, wherein the hash results are used for flow based routing by the network device.

9. The system of claim 8 wherein the rotation operation performed on the source address comprises a rotation of the source address by a plurality of bit positions.

10. The system of claim 8 wherein the rotator unit is configured to modifying the destination address by using the rotation operation.

11. The system of claim 10 wherein the rotation operation performed on the destination address comprises a rotation of the destination address by a plurality of bit positions.

12. The system of claim 8 wherein the first data flow includes data flowing from a first client to a second client and the second data flow includes data flowing from the second client to the first client.

13. The system of claim 8 wherein the first hash result and the second hash result are output for indexing with a routing table used for flow based routing in the network device.

14. The system of claim 8 wherein the first address and the second address are 128-bit address inputs.

15. The system of claim 8 wherein the first data flow and the second data flow comprise flows in a forward direction between the first address input and the second address input and flows in a reverse direction between the first address input and the second address input.

16. The system of claim 8 wherein the first address and the second address are 32 bit address inputs.

17. A system for performing flow based address hash transformation in a network device to generate hash pointers, comprising:

means for receiving a first address input and a second address input, wherein the first address input and second address input include a respective source address and destination address;

means for modifying the second address input using a rotation operation on the source address of the second address input; and means for performing a hash operation on the first address input and the modified second address input wherein the rotation operation prevents hash pointer collisions between a forward flow and a reverse flow between the first address input and the second address input.

18. The system of claim 17 further comprising:

means for modifying the second address input by using a rotation operation on the destination address of the second address input.

19. The system of claim 17 wherein the forward flow includes data flowing from a first client to a second client and the reverse flow includes data flowing from the second client to the first client.

20. The system of claim 17 wherein a hash result of the hash operation is used for flow based routing in the network device.

21. The system of claim 17 wherein the first address input and the second address input are 128-bit address inputs.

22. The system of claim 17 wherein the forward flow and the reverse flow comprise flows in a first direction between the first address input and the second address input or a second direction between the first address input and the second address input.

23. The system of claim 17 wherein the system is implemented within a single ASIC.

24. A computer readable media having computer readable code which when executed by a computer system of a network device cause the network device to implement a method for performing flow based address hash transformation, comprising:

accessing a first address input, wherein said first address input includes a source address;

accessing a second address input, wherein said second address input includes a destination address;

changing the second address input using a rotation operation on the source address of the second address input; and executing a hash operation on the first address input and the modified second address input wherein the rotation operation prevents hash pointer collisions between a forward flow and a reverse flow between the first address input and the second address input.

25. The media of claim 24 wherein the hash generates a hash result used for flow based routing in the network device.

* * * * *